(12) United States Patent
Dollinger et al.

(10) Patent No.: US 11,990,649 B2
(45) Date of Patent: May 21, 2024

(54) FUEL CELL DEVICE

(71) Applicant: AUDI AG, Ingolstadt (DE)

(72) Inventors: Peter Dollinger, Ingolstadt (DE); Markus Gretzer, Eichstätt (DE); Hans Reiss, Ingolstadt (DE); Ludwig Högg, Steinheim an der Murr (DE); Norbert Kluy, Schönfeld (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/764,361

(22) PCT Filed: Oct. 1, 2018

(86) PCT No.: PCT/EP2018/076586
§ 371 (c)(1),
(2) Date: May 14, 2020

(87) PCT Pub. No.: WO2019/096480
PCT Pub. Date: May 23, 2019

(65) Prior Publication Data
US 2020/0280076 A1    Sep. 3, 2020

(30) Foreign Application Priority Data
Nov. 15, 2017 (DE) ............ 10 2017 220 354.4

(51) Int. Cl.
H01M 8/0258 (2016.01)
H01M 8/0267 (2016.01)
(Continued)

(52) U.S. Cl.
CPC ....... H01M 8/0258 (2013.01); H01M 8/0267 (2013.01); H01M 8/0273 (2013.01); H01M 8/242 (2013.01); H01M 8/2485 (2013.01)

(58) Field of Classification Search
CPC ............ H01M 8/0258; H01M 8/0267; H01M 8/0273; H01M 8/242; H01M 8/2485
See application file for complete search history.

(56) References Cited

U.S. PATENT DOCUMENTS

| | | | |
|---|---|---|---|
| 2005/0089736 | A1 | 4/2005 | Meyers et al. |
| 2011/0318666 | A1 | 12/2011 | Patterson, Jr. et al. |
| 2016/0351920 | A1* | 12/2016 | Lai ............ H01M 8/0273 |

FOREIGN PATENT DOCUMENTS

| | | | | |
|---|---|---|---|---|
| CN | 2476106 | * | 2/2002 | ............ H01M 8/10 |
| DE | 103 15 601 A1 | | 10/2004 | |

(Continued)

OTHER PUBLICATIONS

Ensinger, Inc. Material Safety Data Sheet, Sep. 10, 1999, Ensinger-Hyde, pp. 1-3 (Year: 1999).*

(Continued)

*Primary Examiner* — Helen Oi K Conley
(74) *Attorney, Agent, or Firm* — Seed IP Law Group LLP

(57) ABSTRACT

A fuel cell device is provided comprising a fuel cell stack, which is formed from a plurality of unit cells which are stacked one above the other in a stacking direction and which each have one or more media channels and a membrane electrode assembly, which comprises a cathode, an anode and a membrane arranged between the cathode and the anode, as well as comprising a media guide extending essentially in parallel to the stacking direction. The media guide can be or is connected to the fuel cell stack in such a way as to guide a medium essentially laterally to the stacking direction into or out of the media channels of the unit cells of the fuel cell stack.

7 Claims, 9 Drawing Sheets

(51) Int. Cl.
*H01M 8/0273* (2016.01)
*H01M 8/242* (2016.01)
*H01M 8/2485* (2016.01)

(56) References Cited

FOREIGN PATENT DOCUMENTS

| | | | |
|---|---|---|---|
| DE | 10 2005 041 623 A1 | 3/2006 | |
| DE | 11 2005 001 754 T5 | 5/2007 | |
| DE | 10 2007 023 544 A1 | 11/2007 | |
| DE | 10 2010 024 316 A1 | 12/2011 | |
| JP | 60-109180 A | 6/1985 | |
| JP | 61-185871 A | 8/1986 | |
| JP | S61173469 A * | 8/1986 | .......... H01M 8/2485 |
| JP | 1977412 * | 6/2007 | .......... H01M 8/0258 |
| JP | 2012-256498 A | 12/2012 | |

OTHER PUBLICATIONS

ExxonMobil, Santopene 101-55, Jun. 20, 2014, exxonmobilechemical, pp. 1-4 (Year: 2014).*

* cited by examiner

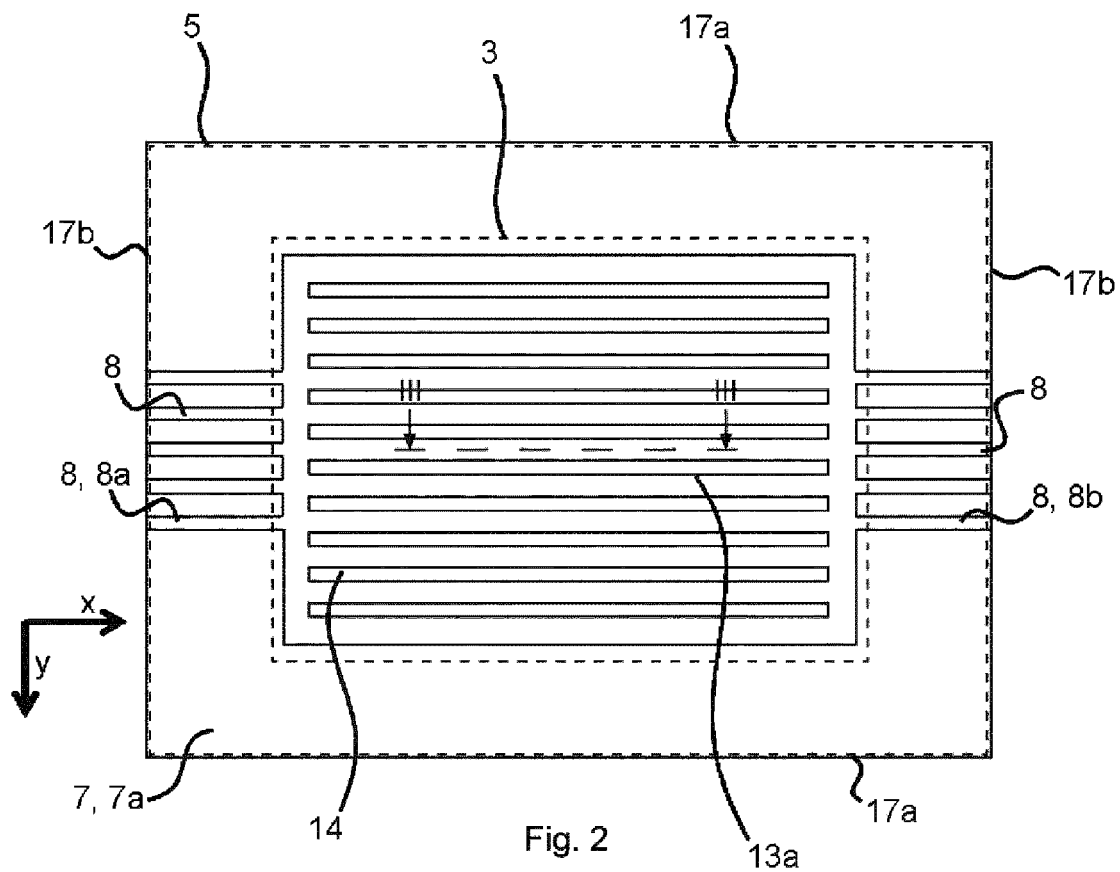
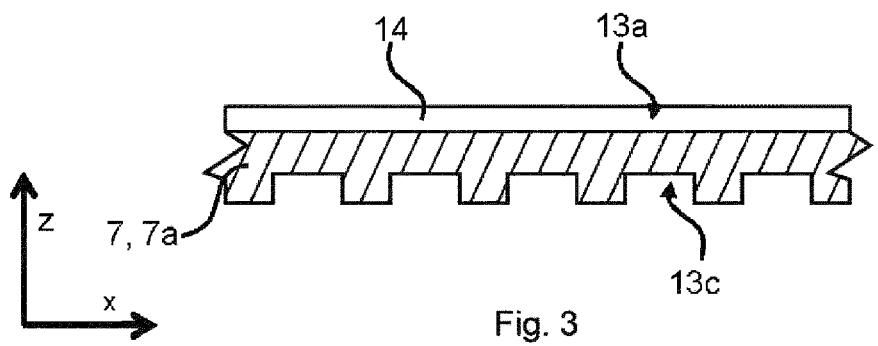
Fig. 3

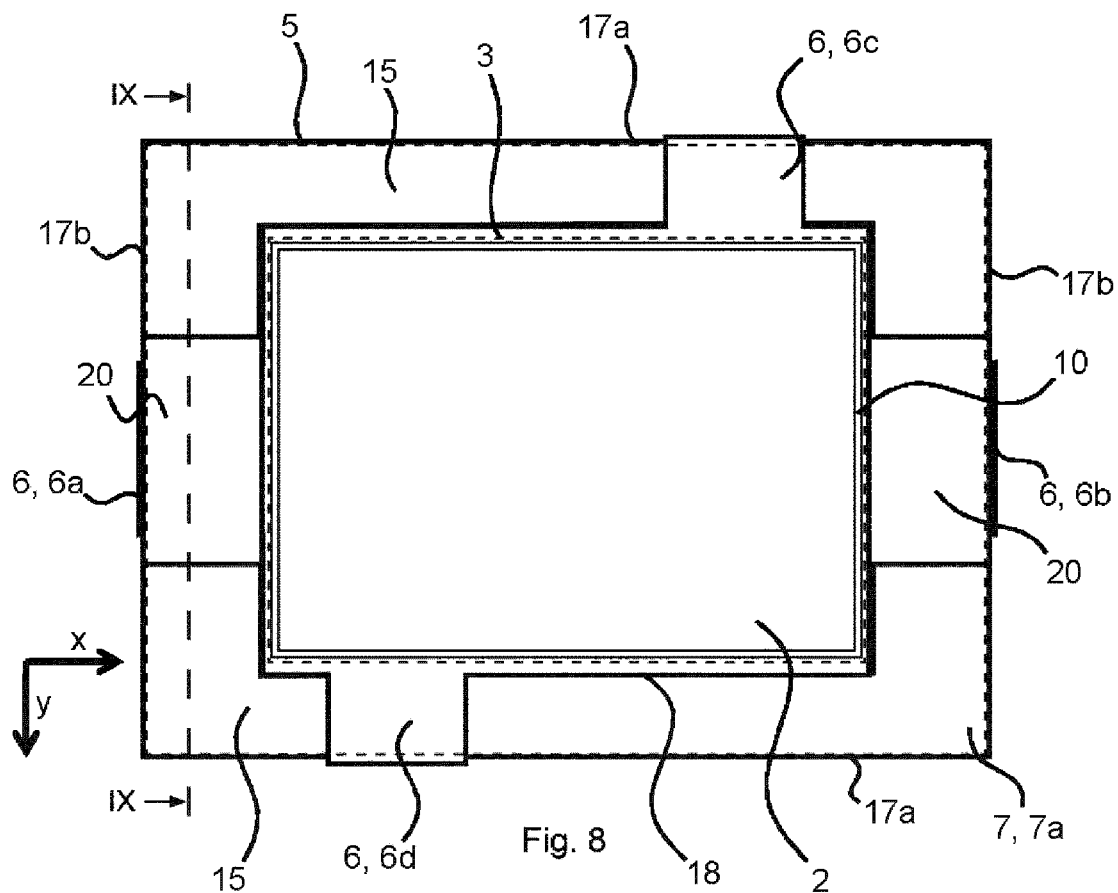
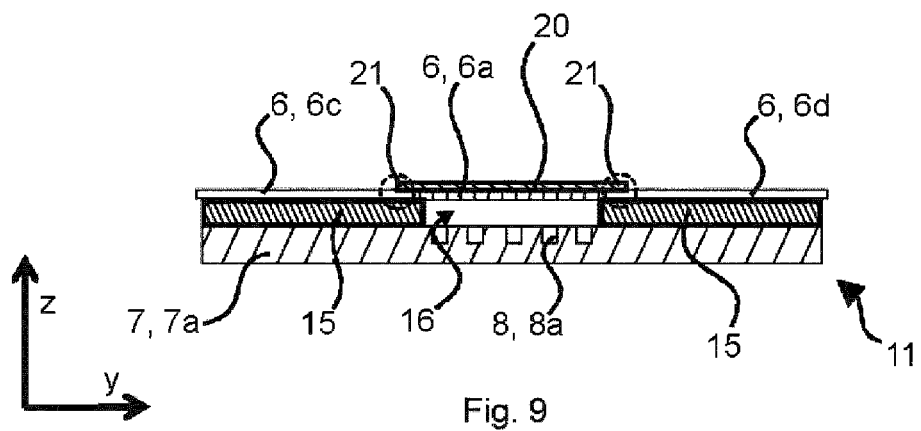

FUEL CELL DEVICE

BACKGROUND

Technical Field

Embodiments of the invention relate to a fuel cell device comprising a fuel cell stack, which is formed from a plurality of unit cells stacked one above the other in a stacking direction. Each of the unit cells has one or more media channels and a membrane electrode assembly (MEA). The membrane electrode assembly comprises a cathode, an anode and a membrane arranged between the cathode and the anode. The fuel cell device also has a media guide extending essentially in parallel to the stacking direction.

Description of the Related Art

Known fuel cell devices have channels formed within the fuel cell stack along the stacking direction. In order to ensure that the reaction media do not mix, a complex sealing structure is needed. During the operation of the fuel cell stack, it is moreover necessary to ensure that the media do not reach the environment outside.

DE 10 2007 023 544 A1 shows a fuel cell device. Manifolds for the operating media and/or for the cooling medium are enclosed by a circumferential seal. In this case, it must be ensured that each of the unit cells of the fuel cell stack seals the manifold accordingly or provides a corresponding passage for the medium to be respectively supplied to the active area. Such a sealing structure is complex to produce.

JPS61-185871 describes an air-cooled fuel cell stack in which external media guides are attached to the plate stack. The media always exit again at the side of the fuel cell stack at which they also entered; in other words, the media are supplied at the same edge as they are discharged, which leads to efficiency disadvantages.

JP2012 256 498 A describes a fuel cell stack with external media guides. In this case as well, the media are supplied at the edge, at which they are also discharged again.

DE 10 2010 024 316 A1 describes a seal for a bipolar plate of a fuel cell, in which media inlets and media outlets are formed. This seal is partly elastically deformable so that it can be prefabricated as a separate component and the bipolar plate is pushed into the seal by temporarily stretching the seal. Instead of stretching, the seal can also be injection-molded.

JPS60-109180 describes a fuel cell stack in which external media guides are screwed to the plate stack such that the media pass through the stack in cross-counterflow operation.

US 2005/0089736 A1 also describes a fuel cell stack with external media guides, with which a cross-counterflow operation can be realized.

Lastly, US 2011/0318666 A1 also describes a corresponding arrangement of external headers on the fuel cell stack, which headers bring about a cross-counterflow operation.

BRIEF SUMMARY

Embodiments of the invention provide a fuel cell device, with which the media supply to the fuel cell stack is simplified.

A media guide can be or is in particular connected to the fuel cell stack in such a way as to guide a medium essentially laterally to the stacking direction into or out of the media channels of the unit cells of the fuel cell stack.

Such an arrangement is advantageous, since a different material can be selected for the media guide than for the unit cells or for the bipolar plates of the unit cells. The number of sealing tracks which have to be produced for sealing the media guides can also be reduced. Production complexity is also reduced as a result.

It is advantageous if the media guide comprises a guide web and guide legs connected thereto. The guide legs can be or are connected to the fuel cell stack. In this way, a U shape can be described, wherein the open end of the "U" points toward the fuel cell stack and the media are thus guided from the outside to the fuel cell stack. The media thus flow within the media guides essentially in parallel to the stacking direction. They pass into the fuel cell stack in a lateral or sideways direction (x/y direction) with respect to the stacking direction.

For improved sealing, it has proven to be advantageous if the media guide is connected to the fuel cell stack by means of joint lines. Such joint lines extend essentially in the stacking direction and are arranged on both sides of the media channels. The joint lines, as well as the media guide, preferably extend in the stacking direction (z direction) over the entire length of the fuel cell stack. Sealing the media guide off from the environment can be achieved by the joint lines provided on the outer edge of the fuel cell stack. The material of the joint lines is preferably selected to materially connect the media guide to the fuel cell stack; thus, to bond the media guide to the fuel cell stack.

In order to realize a fuel cell stack with a high efficiency, it is expedient if the unit cells have an active area and an edge region which is located outside the active area and in which the one or more medium channels are formed for guiding the at least one medium into or out of the active area. The active area is essentially the region in which the electrochemical reaction of a fuel cell takes place. In particular, the active area is bounded circumferentially by the non-active edge region. The edge region is essentially provided for producing a seal between two adjacent bipolar plates and in particular for providing the media channels for supplying media, such as reaction media or cooling media.

In this context, it has been found to be advantageous if the unit cells comprise a first bipolar plate with a first media inlet channel and a first media outlet channel, as well as a first flow field connecting the first media inlet channel to the first media outlet channel. Via this flow field, a reaction medium can, for example, be supplied to a membrane electrode assembly located in the active area.

In order to supply a second medium to the membrane electrode assembly, it is expedient if the unit cells comprise a second bipolar plate with a second media inlet channel and a second medium outlet channel. The second media inlet channel and the second media outlet channel are connected to one another via a second flow field.

For the additional sealing of the cathode from the anode of the membrane electrode assembly, it is advantageous if the sealing structure has a sealing edge which laterally seals the membrane electrode assembly.

A fuel cell device to be manufactured in a simple manner is also characterized in that several media guides are provided. Such media guides are preferably divided into a first media supply for supplying a first reaction medium and a first media discharge for discharging the at least partially consumed first reaction medium. The several media guides are furthermore divided into a second media supply for supplying a second reaction medium and a second media discharge for discharging the at least partially consumed second reaction medium. The two reaction media are thus guided laterally along the fuel cell stack, i.e., externally to the stack, in the media guides, wherein they can enter or exit from the unit cells of the fuel cell stack perpendicularly to the stacking direction, thus laterally.

In order to additionally guide a coolant along the fuel cell stack and externally to the stack, and in order to guide the coolant laterally into the unit cells or between two unit cells into the fuel cell stack, it has proven to be expedient if the media guides are moreover divided into a coolant supply and a coolant discharge.

BRIEF DESCRIPTION OF THE SEVERAL VIEWS OF THE DRAWINGS

Embodiments of the invention are explained in more detail below with reference to the drawings.

FIG. 2 illustrates a (first) bipolar plate of a unit cell in a plan view,

FIG. 3 illustrates the section of FIG. 2,

FIG. 8 illustrates the configuration of FIG. 6 with an applied connecting layer, FIG. 9 illustrates the section IX-IX of FIG. 8 (uncompressed state)

It should be noted in advance that the dimensions, proportions and scale of the illustrations shown are not specified and may vary. In particular, in the sectional illustrations, the individual layers are represented in such a way that it is possible to understand the mutual position in which and the order in which the individual layers are stacked on top of each other.

DETAILED DESCRIPTION

Figure 1:
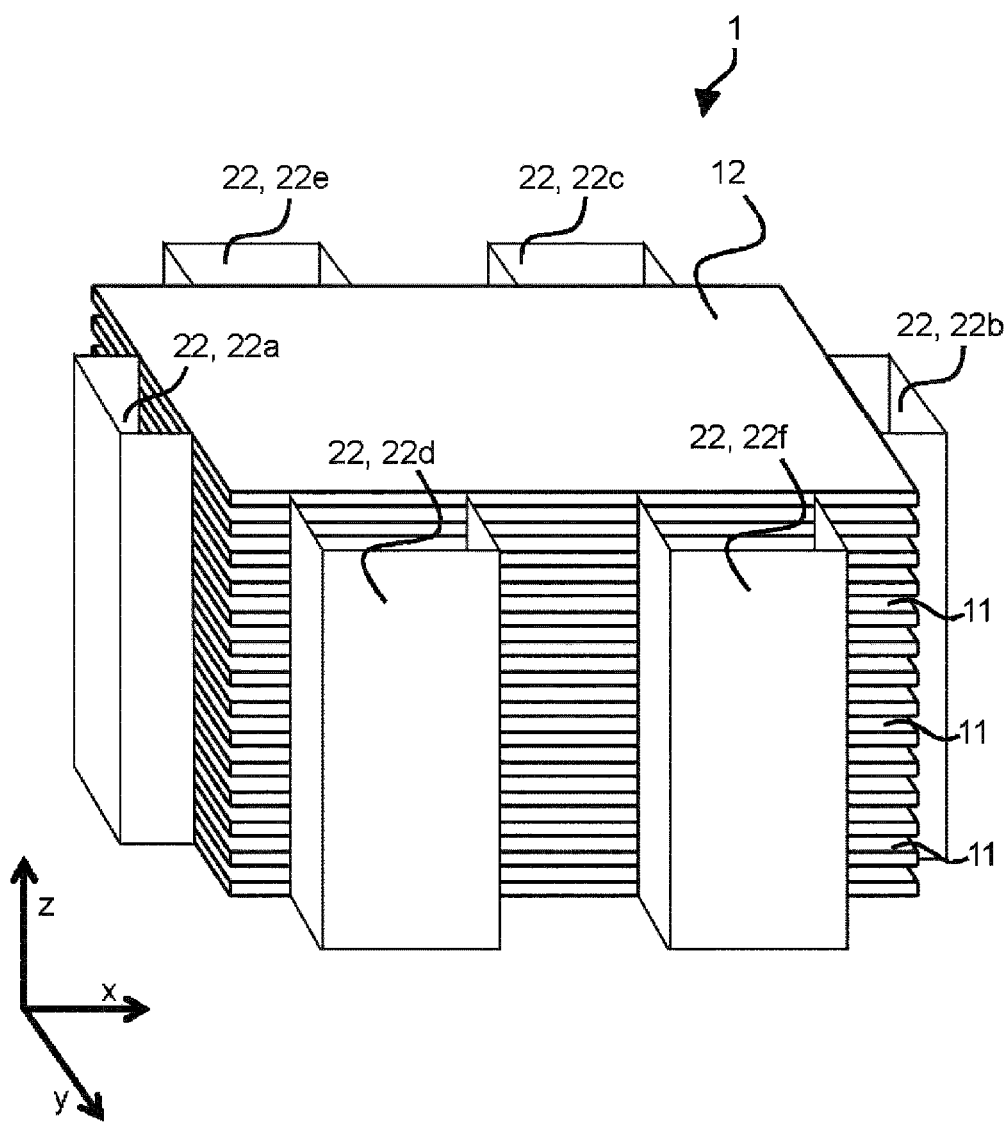
FIG. 1 illustrates a fuel cell device in a perspective view.

FIG. 1 shows a fuel cell device 1 with a fuel cell stack 12. The fuel cell stack 12 is formed of a plurality of unit cells 11 stacked one above the other in a stacking direction (z direction). The unit cells 11 each comprise one or more media channels 8 and a membrane electrode assembly 2. Each of the membrane electrode assemblies 2 in the unit cells 11 comprises a cathode, an anode and an ion-conductive membrane arranged between the cathode and the anode.

The fuel cell device 1 also has media guides 22 which extend in parallel to the stacking direction and are connected to the fuel cell stack 12 in such a way as to guide a medium essentially laterally to the stacking direction into or out of the media channels 8 of the unit cells 11 of the fuel cell stack 12. For this purpose, the present fuel cell device 1 comprises several media guides 22, which are divided into a first media supply 22a for supplying a first reaction medium (e.g., hydrogen) to the anodes and into a first media discharge 22b for discharging the first reaction medium (partially) consumed in the unit cells 11. The media guides 22 are also divided into a second media supply 22c for supplying a second reaction medium (e.g., oxygen or air) to the cathodes and into a second media discharge 22d for discharging the second reaction medium (partially) consumed in the unit cells 11. Lastly, the media guides are also divided into a coolant supply 22e for supplying a coolant (e.g., liquid water) and into a coolant discharge 22f for discharging (partially) heated coolant.

The production or the construction of the shown unit cells 11 of the fuel cell stack 12 is explained below by way of example with reference to FIGS. 2 to 11.

FIG. 2 shows a bipolar plate 7 of one of the unit cells 11. This first bipolar plate 7a has an inner active area 3 shown in dashed lines and an outer edge region 5 shown in dashed lines. In the edge region 5, several media channels 8 are formed, which can be divided into the first media inlet channels 8a shown on the left in the drawing and into the first media outlet channels 8b shown on the right in the drawing.

Here, five of the first media inlet channels 8a and five of the first media outlet channels 8b are formed in the first bipolar plate 7a. A different number is possible. The first media inlet channels 8a are fluidically connected to the first media outlet channels 8b via a first flow field 13a. This flow field 13a is located in the active area 3 and can provide a reaction medium to an adjacent membrane electrode assembly 2. In the example of FIG. 2, the flow field 13a comprises several guides or walls 14 for uniformly distributing a reaction medium over the surface of the membrane electrode assembly 2. However, it is also possible to use other types of flow fields 13a, for example ones in which the flow of the reaction medium is guided in a meandering shape over the region of the active surface. The spacing of the walls 14, of the walls, or of the webs may also vary. The depth of the channel formed by adjacent walls 14 may also be of different depths and vary.

As can be seen in FIG. 3, the section of FIG. 2, a flow field 13c is also formed on the side of the first bipolar plate 7a facing away from the membrane electrode assembly 2 and serves for the flow-through of another medium, e.g., a coolant.

Figure 4:
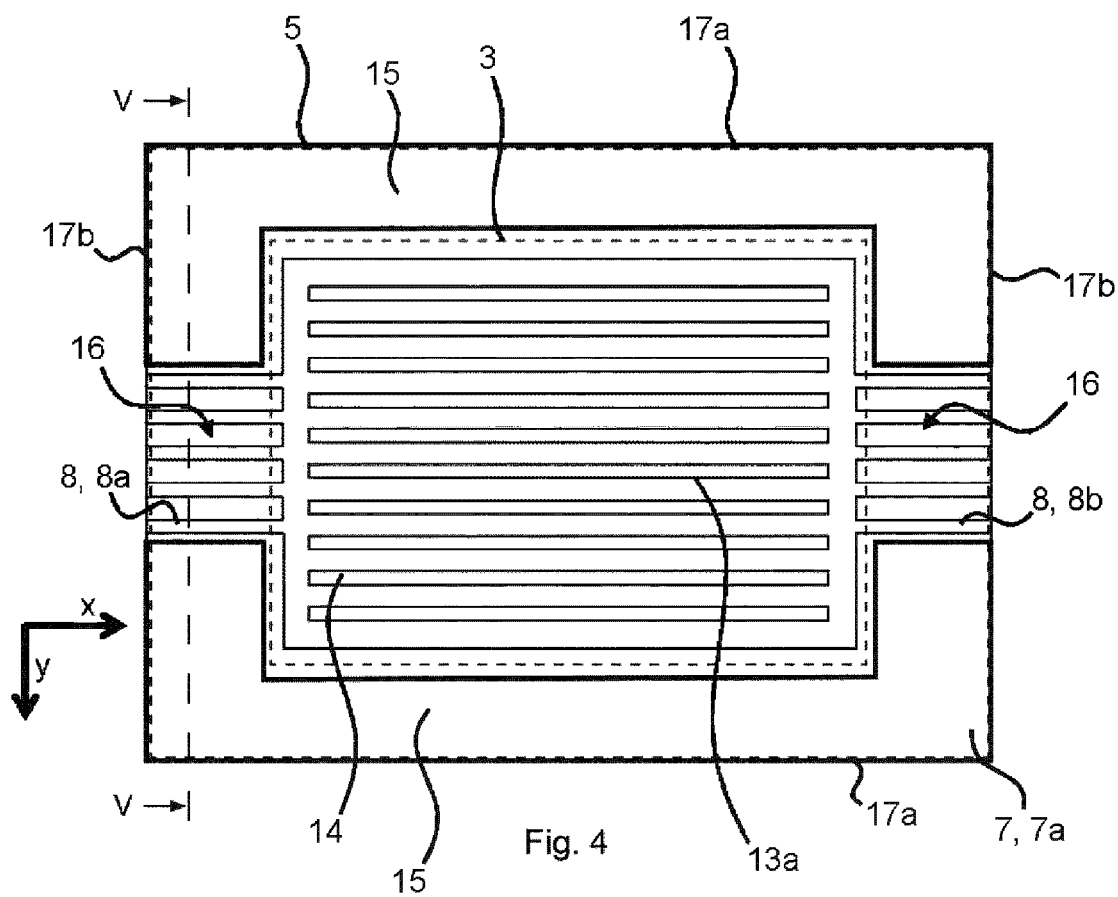
FIG. 4 illustrates the (first) bipolar plate of FIG. 2 with applied composite layer in a plan view.

As FIG. 4 shows, a composite layer 15, in particular a joining layer, is applied to the first bipolar plate 7a in the edge region 5. This composite layer 15 is formed in several parts or has recesses 16 in the region of the media channels 8a, 8b. The recesses 16 ensure that the media inlet channels 8a and the media outlet channels 8b are not sealed and later allow media to pass through.

Figure 5:
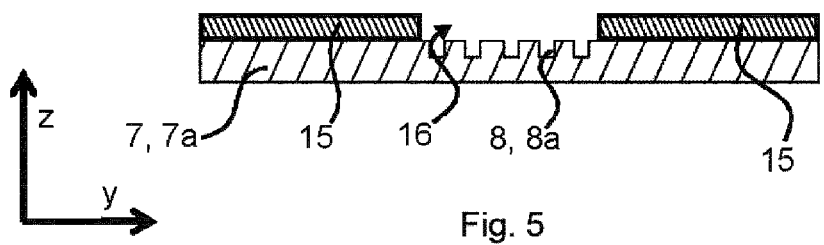
FIG. 5 illustrates the section V-V of FIG. 4 (uncompressed state)

The composite layer 15 applied in the edge region 5 extends along the long edge 17a of the first bipolar plate 7a, so that a flush end with the edge region 5 predetermined by the dimensions of the bipolar plate 7 is produced. This composite layer 15 seals the active surface or active area 3 from the environment, wherein the material of the composite layer 15 is to be selected such that this sealing function is ensured. FIG. 5, the section V-V of FIG. 4, shows the flush end of the composite layer 15 or of the joining material with the bipolar plate 7 along its long edges 17a. The sections of the composite layer 15 located at the short edges 17b are also preferably flush with the bipolar plate 7. The chosen representation of the composite layer 15 is exemplary. It can be designed to be much thinner than the first bipolar plate 7a.

Figure 6:
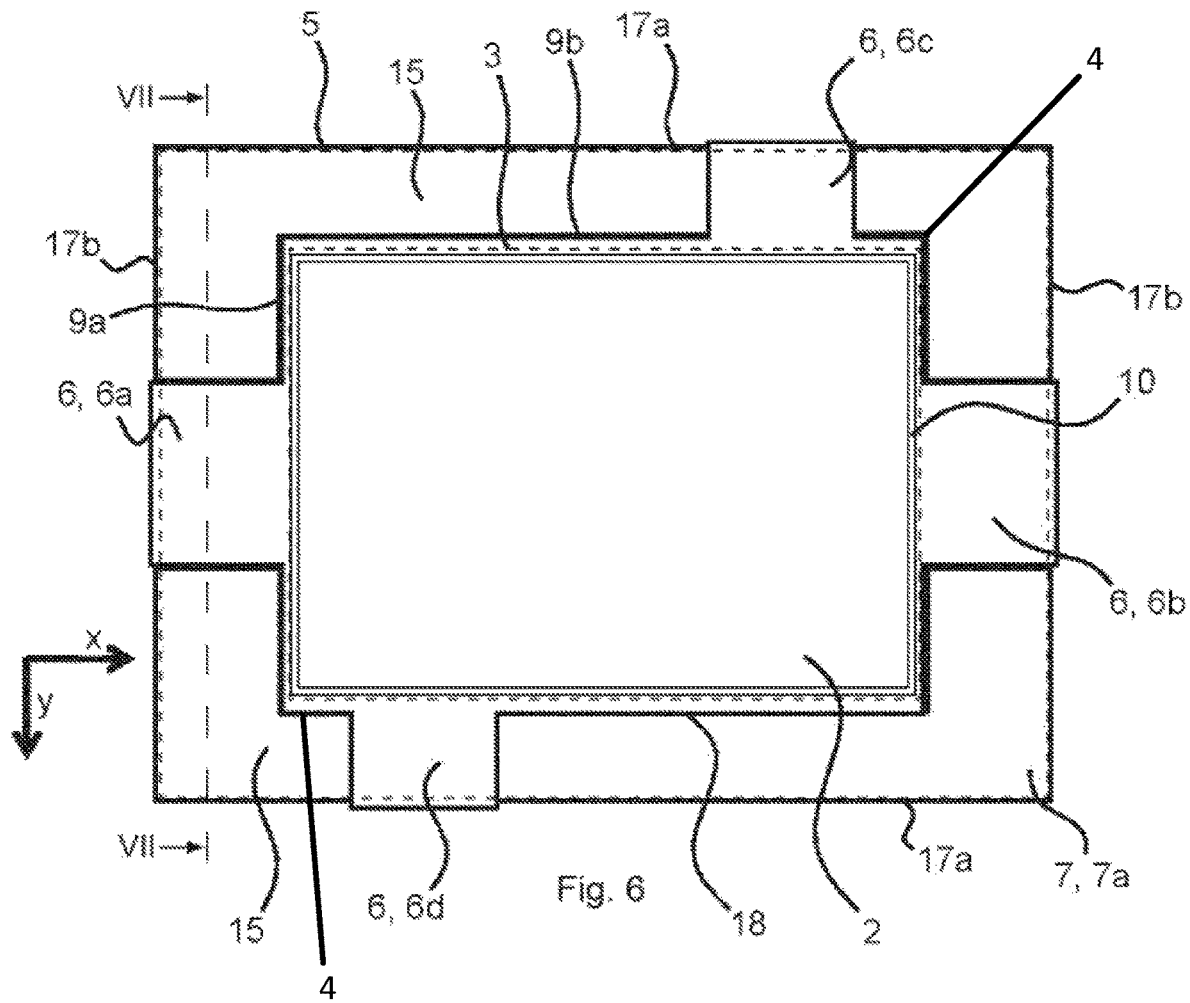
FIG. 6 illustrates the (first) bipolar plate of FIG. 4 with a fuel cell arrangement placed thereon.

In FIG. 6, a fuel cell arrangement with a membrane electrode assembly 2 was applied to or placed on the first bipolar plate 7a covered with the composite layer 15 according to FIG. 4. The active area 3 is essentially predetermined by the dimensions of the membrane electrode assembly 2 and is again outlined in the figure by the inner dashed line. However, the active area 3 extends not only in a plane (x/y plane) but also in the stacking direction (z direction), which is directed out of or into the paper plane.

The active area 3 is the region in which the electrochemical reaction of the fuel cell formed by the membrane electrode assembly 2 takes place. In the electrochemical reaction, a fuel (e.g., hydrogen) is guided to the anode where it is catalytically oxidized to protons, releasing electrons. These protons are transported to the cathode through the ion-exchange membrane. The electrons discharged from the fuel cell preferably flow via an electrical load to an electric motor for driving a vehicle or to a battery. The electrons are then guided to the cathode. At the cathode, the oxidizing medium (e.g., oxygen or oxygen-containing air) is reduced by receiving the electrons to anions, which react directly with the protons to form water.

In order to ensure that the fuel directly reaches the anode or that the oxidizing medium directly reaches the cathode, a sealing structure 4 is laterally assigned to the membrane electrode assembly 2. The combination of the membrane electrode assembly 2 and the sealing structure 4 forms a common fuel cell arrangement. The sealing structure 4 comprises components, which extend into the edge region 5 or even project beyond the edge region 5. Such components are thus arranged outside the active area 3. In other words, the edge region 5 delimits the active area 3 in the radial or lateral direction or circumferentially.

It can be seen that the sealing structure 4 comprises a sealing tongue 6 extending into or over the edge region 5 for axially covering in a gas-tight manner a media channel 8 formed in an adjacent bipolar plate 7 and located in the edge region 5. The fuel cell arrangement shown here has a total of four sealing tongues 6. Two of the sealing tongues 6 are arranged opposite one another at the shorter edge 9a of the membrane electrode assembly 2. The other two sealing tongues 6 are arranged at the long edge 9b of the membrane electrode assembly 2 opposite one another and offset from each other. The sealing tongues 6 in the present case all have a rectangular shape. However, polygonal shapes of the sealing tongues are possible, wherein rounded sealing tongues 6 also come into consideration.

The sealing structure 4 and in particular the sealing tongues 6 are dimensionally stable with regard to a pressure and/or tensile load acting axially thereon. It can also be seen that the sealing tongues 6 extend beyond the edge region 5. However, it is also possible for one or more of the sealing tongues 6 to extend only into the edge region 5 but to not cover it completely or project laterally beyond it.

Moreover, it can be seen that the sealing structure 4 has a sealing edge 10 which laterally seals the membrane electrode assembly 2. The sealing line formed by the sealing edge 10 seals the membrane electrode assembly 2 against lateral leakage of media.

The sealing tongue 6 of the fuel cell arrangement 1 on the left side axially covers in a gas-tight manner the left media channels 8 of the first bipolar plate 7a. The right sealing tongue 6 of the fuel cell arrangement 1 axially covers in an gas-tight manner the right media channels 8 of the first bipolar plate 7a. In other words, the left sealing tongue 6 is thus formed as a first inlet sealing tongue 6a for axially covering in a gas-tight manner the first media inlet channel 8a on the left. Accordingly, the right sealing tongue 6 is formed as a first outlet sealing tongue 6b for axially covering in a gas-tight manner the right first media outlet channel 8b. The sealing tongues 6 provided at the long edge 17a of the bipolar plate 7a rest on the composite layer 15. They can be divided into a second inlet sealing tongue 6c and a second outlet sealing tongue 6d.

A plastic or a plastic mixture which preferably has a lower thermal stability compared to the plastic or plastic mixture of the sealing structure 4 or of the sealing tongues 6 can be used as the material of the composite layer 15. During a (hot) pressing process, the sealing tongues 6 can thus sink into the composite layer 15 and preferably merge with it, wherein the sealing tongues 6 maintain their dimensional stability. In other words, the melting point of the material of the sealing structure 4 is above the melting point of the material of the composite layer 15.

In the central region, i.e., where the active area 3 is located, the sealing structure 4 of the fuel cell arrangement 1 is adapted with regard to its outer contour to the inner contour predetermined by the composite layer 15. In this case, the sealing tongue-free sections of the sealing structure 4 form contact points, contact lines 18 or contact surfaces with the composite layer 15, so that a sealing function is additionally ensured.

Figure 7:
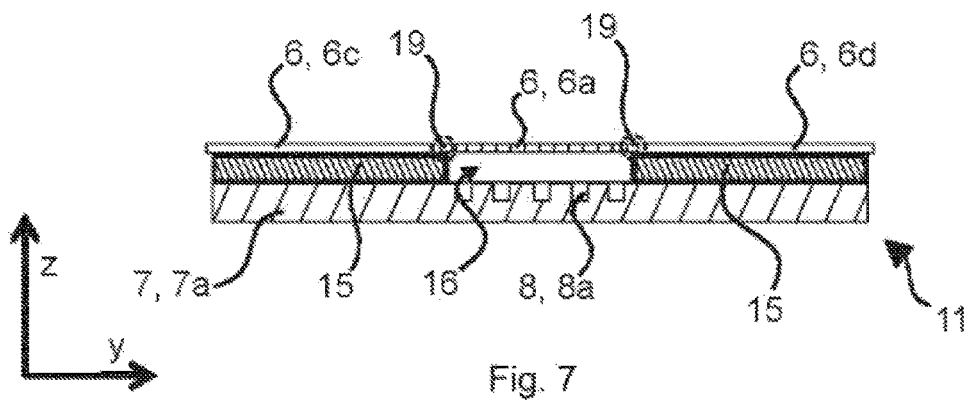
FIG. 7 illustrates the section VII-VII of FIG. 6 (uncompressed state)

FIG. 7, the section VII-VII of FIG. 6, shows an uncompressed sectional view of the partial unit cell 11. It can be seen that the first sealing tongues 6a, 6b project beyond the composite layer 15 and form overhangs 19 therewith. The necessary sealing in the lateral direction is ensured in this case. Here, too, the illustration chosen is not to be understood as true to scale. The thicknesses of the individual layers may vary, in particular after a connecting process or joining process (hot pressing process), after which they can seem or act like a single common layer. The region of the recess 16 located between the inlet sealing tongue 6a and the channels 8 is then also minimized in such a way that the inlet sealing tongues 6a axially cover the channels 8. A medium can be supplied to the membrane electrode assembly 2 laterally and in the stacking direction below the first inlet sealing tongue 8a. (Partially) consumed medium can then leave the unit cell 11 of the fuel cell stack 12 laterally and in the stacking direction below the first outlet sealing tongue 8b.

In FIG. 8, a connecting layer 20, which is to be understood as a further joining layer, is applied to the first inlet sealing tongue 6a and to the first outlet sealing tongue 6b. The composite layer 15 and the connecting layer 20 ensure a secure connection of a first bipolar plate 7a in the stacking direction to a second bipolar plate 7b. The composite layer 15 forms overlaps 21 with the connecting layer 20 such that the two layers have a contact surface in the stacking direction. A sealing function is thereby ensured. The overlaps 21 can be seen in more detail in FIG. 9, the section IX-IX of FIG. 8. Here as well, an uncompressed state is shown which is not to scale, but which is intended to illustrate the stacked arrangement of the individual layers.

Figure 10:
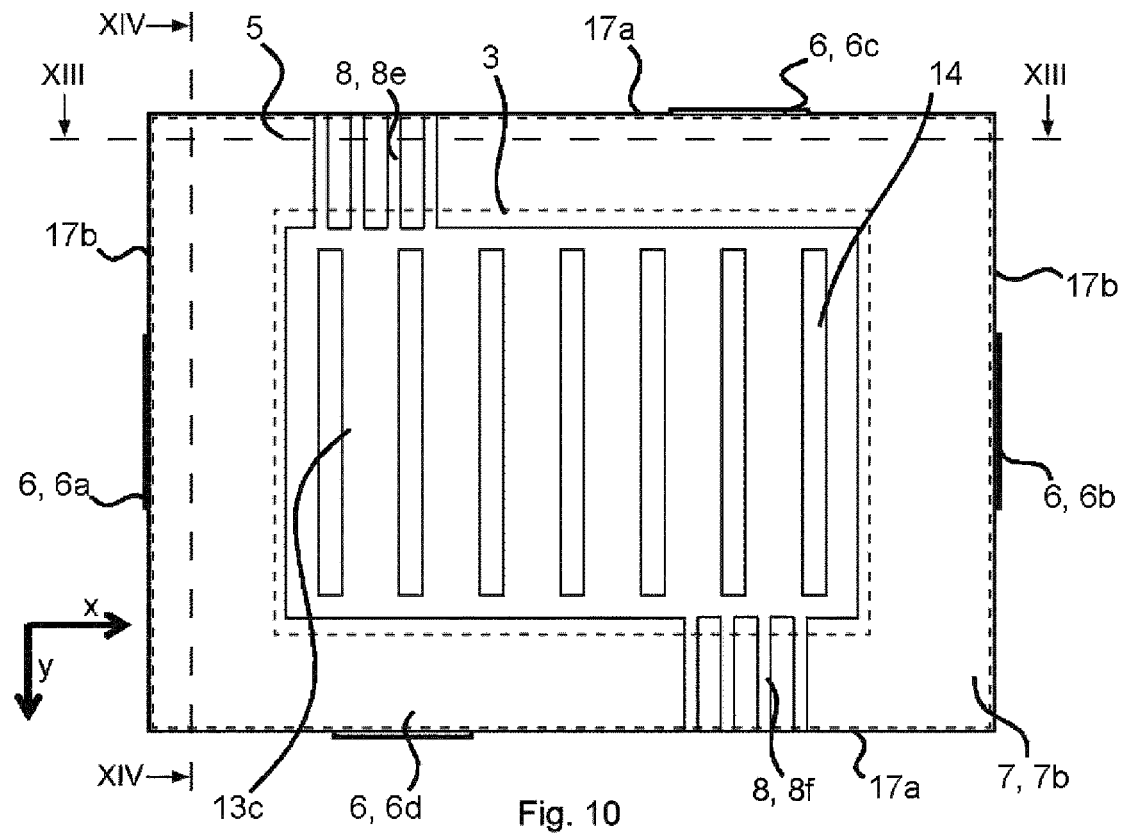
FIG. 10 illustrates a unit cell of the fuel cell stack with a (second) bipolar plate in a plan view.

In order to complete the unit cell 11, a second bipolar plate 7b can now be applied to the composite layer 15 and the connecting layer 20 connected thereto. This is shown in FIG. 10. The first bipolar plate 7a and the second bipolar plate 7b can be connected to one another by the joining layers in such a way that a unit cell, provided at most with small overhangs, of first bipolar plate 7a, fuel cell arrangement, and second bipolar plate 7b is produced. However, the individual layers of the unit cell 11 are preferably connected without edges or without offsets in the stacking direction, so that a joint line 25 to be discussed further below can be applied or attached in a simple manner.

Figure 11:
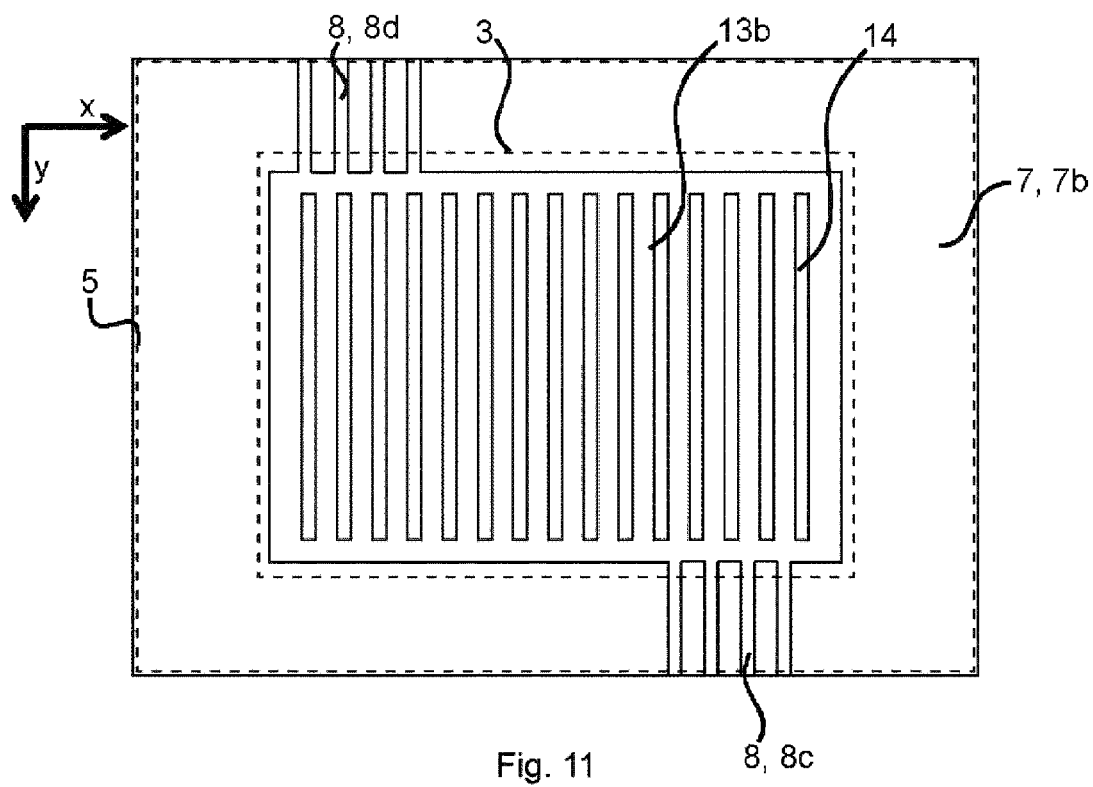
FIG. 11 illustrates the (second) bipolar plate in a bottom view, i.e., in a view of the surface of the second bipolar plate facing the membrane electrode assembly.

Like the first bipolar plate 7a, the second bipolar plate 7b shown in FIG. 10 and FIG. 11 also has on its side facing away from the membrane electrode assembly 2 a flow field 13c for guiding a cooling medium. This flow field 13c is located essentially in the active area 3. It is fluidically connected to coolant inlet channels 8e and coolant outlet channels 8f.

On its side facing the membrane electrode assembly 2, however, the second bipolar plate 7b has one or more second media inlet channels 8c and one or more second media outlet channels 8d (FIG. 11). It also comprises a second flow field 13b which is fluidically connected to the second media inlet channel 8c and the second media outlet channel 8d and via which one of the reaction media can be supplied to the membrane electrode assembly 2.

Figure 12:
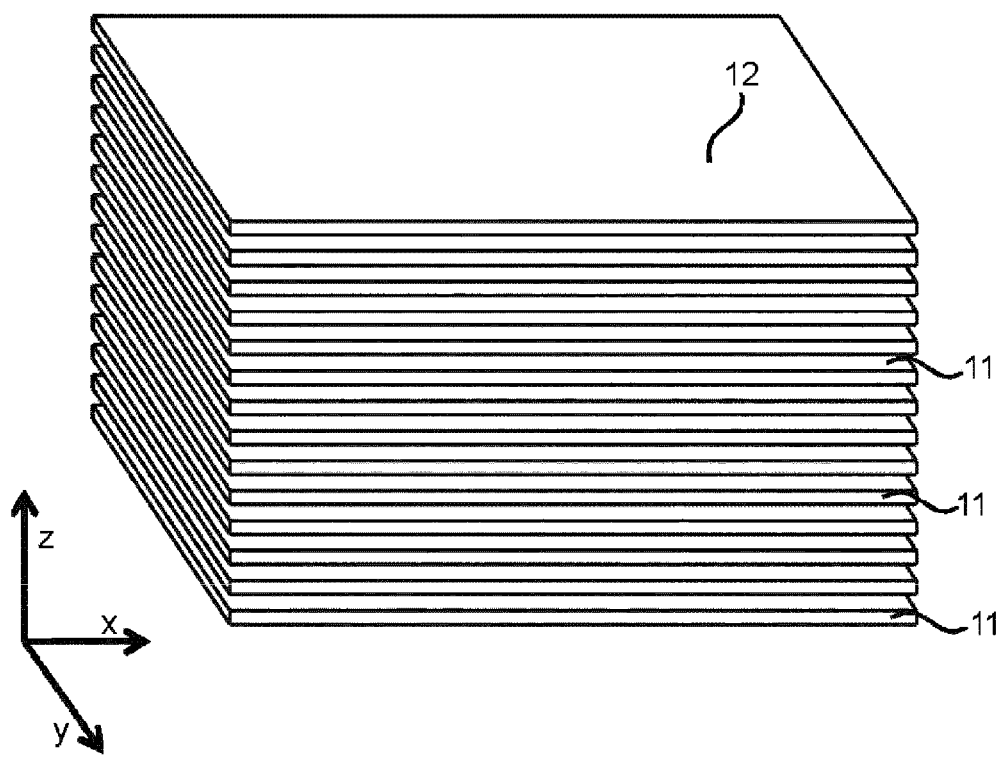
FIG. 12 illustrates a fuel cell stack formed of several unit cells corresponding to FIG. 10 in a perspective view.

FIG. 12 shows a fuel cell stack 12 formed from several unit cells 11. Such fuel cell stack 12 has the advantage that the bipolar plates 7 can be designed with smaller dimensions in comparison to known bipolar plates, so that the production costs of the fuel cell stack 12 are reduced. In the present case, the bipolar plates 7 are rectangular in shape, but are also applicable without limitation to any shapes with, for example, round or curved line layouts.

Figure 13:
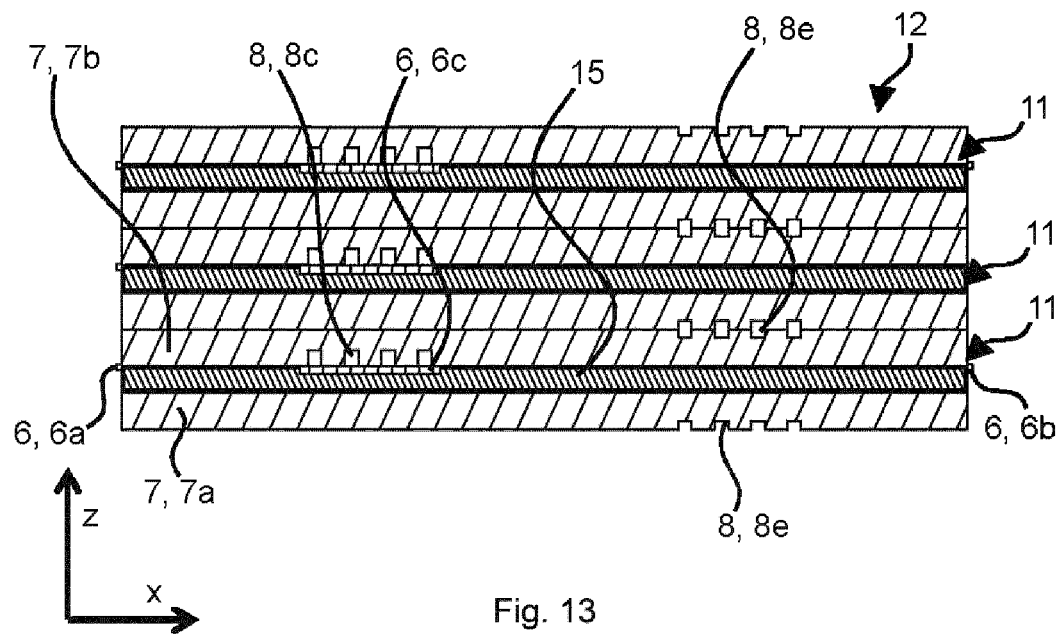
FIG. 13 illustrates the sectional view XIII-XIII of FIG. 10 through a plurality of unit cells stacked one above the other (compressed state)

FIG. 13 shows an exemplary sectional view along section XIII-XIII of FIG. 10 through a fuel cell stack 12. It can be seen that the composite layer 15 touches or contacts both the first bipolar plate 7a and the second bipolar plate 7b after the joining or hot pressing process, wherein the bipolar plates 7 are connected to one another or are joined to one another via the composite layer 15. It can also be seen that the second media inlet channels 8c are axially covered in a gas-tight manner by the second inlet sealing tongue 6c extending into or over the edge region 5. The same happens analogously at the opposite edge of the second bipolar plate 7b, where second outlet sealing tongues 6d extending into or over the edge region 5 are provided for axially covering in a gas-tight manner the second media outlet channels 8d. FIG. 12 also shows that a second reaction medium is guided laterally and in the stacking direction above the sealing structure 4 to the membrane electrode assembly 2. Correspondingly, the (partially) consumed second reaction medium is also guided out of the unit cells 11 or out of the fuel cell stack 12 again laterally in the stacking direction above the sealing structure 4.

The second bipolar plate 7b of a first unit cell 11 then forms with a first bipolar plate 7a of a further unit cell 11 the complete channel cross-section for the passage of the cooling medium. In other words, they then also form the coolant inlet channels 8e and the coolant outlet channels 8f. The second bipolar plate 7b of the first unit cell 11 and the first bipolar plate 7a of the further unit cell 11 can also be joined to one another using a joining means or joining medium. Alternatively, a generatively manufactured one-piece design of the adjacent bipolar plates 7 is possible.

Figure 14:
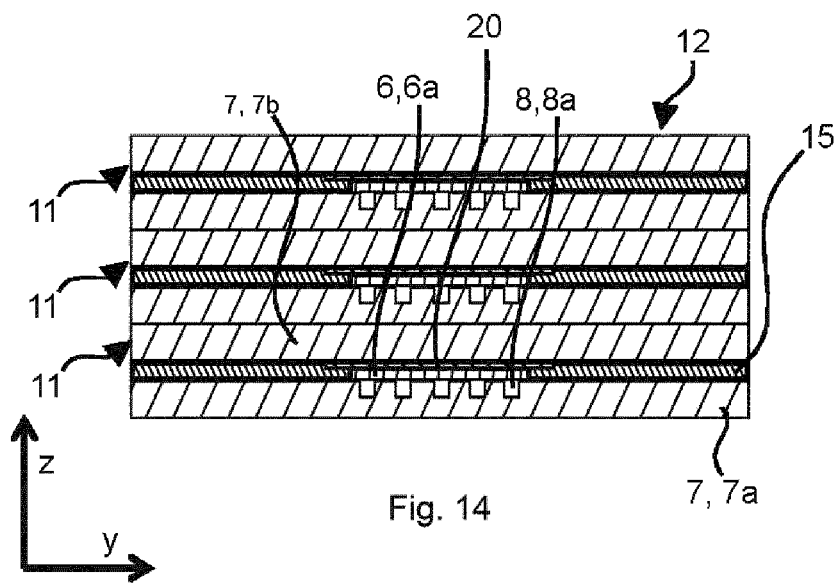
FIG. 14 illustrates the sectional view XIV-XIV of FIG. 10 through a plurality of unit cells stacked one above the other (compressed state)

FIG. 14 shows an exemplary sectional view along section XIV-XIV of FIG. 10 through a fuel cell stack 12. It can be seen that the second bipolar plate 7a is applied to the connecting layer 20 and the composite layer 15 in the stacking direction. It can also be seen that a first reaction medium is guided in the stacking direction below the sealing structure 4 to the membrane electrode assembly 2. The first media inlet channels 8a are axially covered in a gas-tight manner by the first inlet sealing tongues 6a. A first reaction medium is supplied on the side or in a lateral direction with respect to the stacking direction. Correspondingly, the (partially) consumed first reaction medium is also, laterally or sideways, guided out of the unit cell 11 or out of the fuel cell stack 12 again in the stacking direction below the sealing structure 4.

Figure 15:
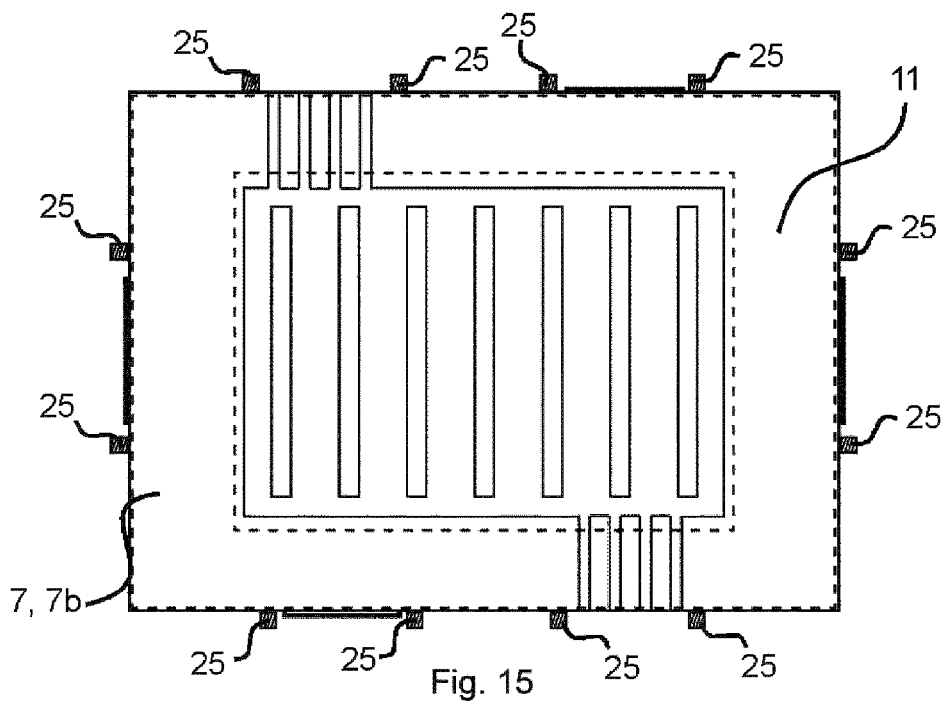
FIG. 15 illustrates a cross-section extending perpendicularly to the stacking direction through the fuel cell stack of FIG. 12 with joint lines attached thereto.

FIG. 15 shows a sectional view through the fuel cell device 1, which corresponds essentially to the plan view of the unit cells 11 according to FIG. 10. It can be seen, however, that joint lines 25 which run essentially in the stacking direction are now attached to the fuel cell stack 12 or to its unit cells 11. The joint lines 25 extend along the entire or whole fuel cell stack 12. The joint lines 25 are arranged on the left and right sides, i.e., on both sides of the media channels 8, so that they seal the media channels 8 from the environment. The same material as for the composite layer 15 or the connecting layer 20 comes into consideration for the joint lines 25, so that the joint lines 25 can also be referred to as a joining layer. The use of a different material for the joint lines 25 is possible. The media guides 22 can now be applied to such joint lines 25, as a result of which they are connected to the fuel cell stack 12.

Figure 16:
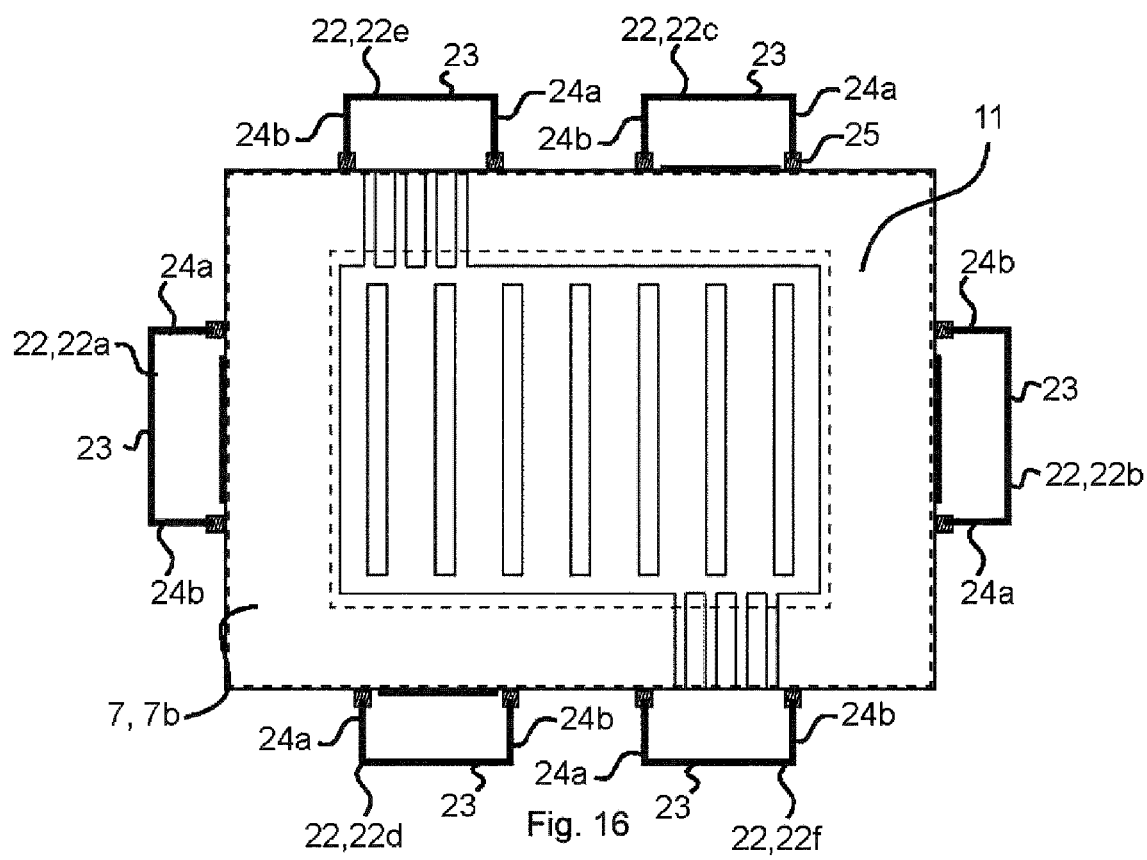
FIG. 16 illustrates a cross-section extending perpendicularly to the stacking direction through the fuel cell device of FIG. 1.

This can be seen in more detail in FIG. 16. The media guides 22 shown here have a guide web 23 and two guide legs 24a, 24b connected at the ends thereof. Each of the guide legs 24a, 24b is connected, preferably glued, to the fuel cell stack 12 by means of one of the joint lines 25. The open side of the media guides 22 faces the fuel cell stack 12, so that a medium flowing therethrough can pass laterally into the unit cells 12. The media guides are essentially rectangular in cross-section, but other shapes are possible. The media channels 22 are preferably formed from a plastic, in particular a dimensionally stable plastic. When electrically insulating joint lines 25 are used, one or more of the media channels 22 could even be formed from a metal.

The present design of the fuel cell device 1 makes it possible to design the edge region 5 as narrow as possible, in order to save expensive material of the bipolar plates 7. The external media guides 22 can also be produced from a different material than the bipolar plates 7 and thus more cost-effectively. A circumferential seal around the media guides 22 can be dispensed with. However, the selected configuration nevertheless ensures the reliable sealing of each unit cell 11 and allows the active area 3 to be maximized in comparison to known unit cells 11.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A fuel cell device, comprising:
   a fuel cell stack, which is formed from a plurality of unit cells which are stacked one above the other in a stacking direction and which each have one or more media channels and a membrane electrode assembly arranged between two bipolar plates and which comprises a cathode, an anode and a membrane arranged between the cathode and the anode, wherein a sealing structure including a sealing tongue including a first plastic material covers the one or more media channels in the stacking direction, wherein the unit cells have an active area and an edge region which is located outside the active area and in which the one or more media channels are formed for guiding at least one medium into or out of the active area, wherein the sealing tongue including the first plastic material covers the one or more media channels in a gas-tight manner in the stacking direction in the edge region outside the active area, wherein a composite layer is applied to the edge regions of the unit cells, and wherein the composite layer includes a second plastic material having a lower thermal stability than the first plastic material; and a plurality of media guides extending essentially in parallel to the stacking direction, wherein the media guides are connected to the bipolar plates of the fuel cell stack in such a way as to guide media into or out of the media channels of the unit cells of the fuel cell stack.

2. The fuel cell device according to claim 1, wherein the second plastic material has a lower melting point than the first plastic material.

3. The fuel cell device according to claim 1, wherein the sealing tongue extends across the one or more media channels.

4. The fuel cell device according to claim 1, wherein the one or more media channels extend from respective media guides to the active area.

5. The fuel cell device according to claim 1, wherein the composite layer has recesses in regions of the media channels.

6. The fuel cell device according to claim 5, wherein the recesses ensure that the media channels are not sealed by the composite layer.

7. The fuel cell device according to claim 5, wherein one of the recesses is located between the sealing tongue and the media channels.

* * * * *